United States Patent Office 3,794,691
Patented Feb. 26, 1974

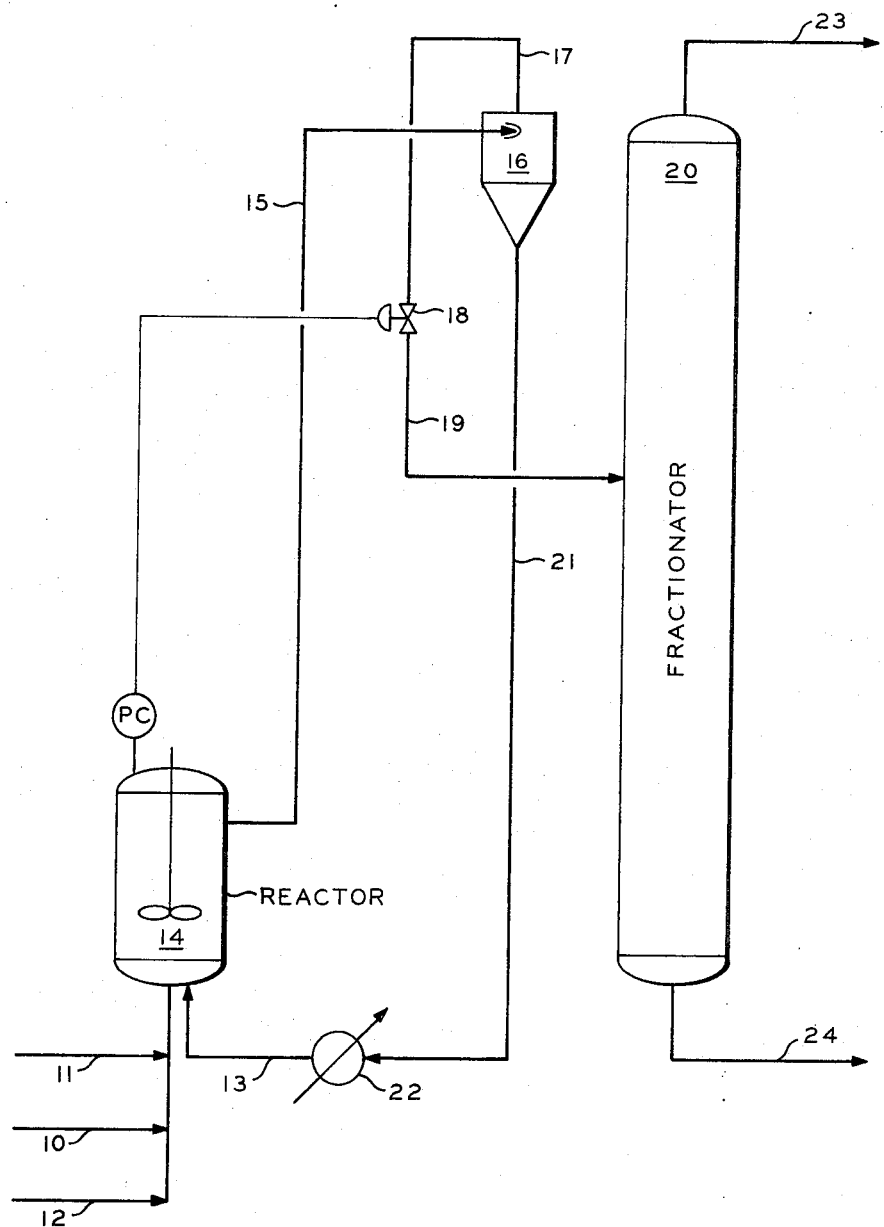

3,794,691
METHOD FOR RECYCLE OF ALKYLATION CATALYSTS
Rolland E. Dixon and John H. Randall, Bartlesville, Okla., assignors to Phillips Petroleum Company
Filed Sept. 2, 1971, Ser. No. 177,358
Int. Cl. C07c 3/52
U.S. Cl. 260—683.43                4 Claims

ABSTRACT OF THE DISCLOSURE

Reaction product catalyst mixture is discharged from an alkylation reaction at a pressure sufficient to effect the separation of the catalyst and the alkylation product in a separator located at a height above the reactor sufficient to produce a liquid head pressure of separated catalyst that is adequate to return the catalyst to the reaction zone without the use of a pumping means in the catalyst return line. In a preferred embodiment the difference in elevation of the reaction zone and the separating zone coupled with the difference in the density of the reaction effluent mixture and the separated catalyst is sufficient to allow the catalyst to be separated in a cyclone separator and returned from the separator through a cooling zone to the reaction zone without use of a pump in the return line.

BACKGROUND OF THE INVENTION

This invention relates to the recycling of a catalyst stream in a reaction system. In one of its aspects, this invention relates to using a fluid head pressure to induce flow into a pressured system. In another of its aspects, this invention relates to the separation of components of a mixture having different densities using a cyclone separator. In one of its concepts this invention relates to inducing a fluid flow of a recycle stream by manipulating the mechanical advantage obtained by transporting a mixture of components to a higher elevation separating a denser portion of the mixture from the mixture and returning the denser portion to a lower elevation for remixing. In other of its concepts this invention relates to the elimination of pumping means from a corrosive recycle stream by the manipulation of fluid head pressure.

Normally in an alkylation reaction system a reaction mixture of reaction product and catalyst is removed from the reaction zone, the reaction product and the catalyst are separated in a separation zone and the separated reaction product is pumped to a fractionation system while the catalyst is recycled to the reaction zone to be used again. In most alkylation reactions the catalysts used are highly corrosive materials. These catalysts include hydrogen halides, e.g., HF, or metal halides, e.g., aluminum chloride such as aluminum chloride-hydrocarbon complex. After separation from the alkylate reaction product, recycle of these catalyst streams to a reaction zone is physically highly deleterious to the recycle stream particularly to items of hardware such as valves and pumps. Maintenance and replacement costs for valves and pumps in transport lines for highly corrosive catalysts are an important item in increasing the cost of alkylate production.

We have found a method for operating an alkylation reaction with separation of the catalyst and return of the catalyst stream to the reaction zone which eliminates the use of valves and pumps in the recycle catalyst line.

Accordingly, an object of this invention is to provide an improved process for the recycle of corrosive, halide containing alkylation catalyst. Another object of this invention is to reduce the amount of equipment necessary in handling corrosive, recycle catalyst streams in an alkylation reaction system.

Other aspects, objects, and the several advantages of this invention are apparent to one skilled in the art from a study of this disclosure, the drawing and the appended claims.

SUMMARY OF THE INVENTION

The process of this invention comprises discharging an alkylation reaction mixture of alkylation catalyst and alkylation products from the reactor at a pressure sufficient to effect separation of the mixture in a separator situated at a height above the reactor such that the catalyst separated from the mixture has sufficient head pressure to be returned to the reaction zone by gravity flow; separating the catalyst and alkylate reaction mixture; removing alkylate reaction mixture from the separator; and removing catalyst from the separator and returning it to the reaction system by the effect of fluid head pressure in the return line.

In a preferred embodiment the difference in elevation of the separator and the reaction zone are balanced against the density difference between the reactor effluent stream and the catalyst return stream to overcome the pressure drop in the operation of a cyclone separator while providing enough elevation to yield pressure on the separator effluent catalyst sufficient to allow return flow of the catalyst into the reactor.

DESCRIPTION OF THE PREFERRED EMBODIMENTS

In general any of the conventional catalytic alkylation reactions can be carried out using the recycle of catalyst by the method of the present invention. Thus the alkylation reaction can comprise reaction of an isoparaffin with an olefin or other alkylatable material, reaction of a normal paraffin with an olefin or other alkylatable material, or reaction of an aromatic hydrocarbon with an olefin or other alkylatable material; the reaction in each instance being carried out in the presence of a suitable alkylation catalyst. In place of an olefin as the alkylatable material various alcohols and ethers such as isopropyl alcohol, tert-butyl alcohol, secondary butyl alcohol, isopropyl ether, and the like can be employed with suitable alkylation catalysts. Likewise, the alkyl halides, sulfates, phosphates, or fluorides of olefins may be used as the alkylatable material with an appropriate or compatible alkylation catalyst.

A variety of alkylation catalysts can be employed in the alkylation reaction, including well-known catalysts, such as sulfuric acid, hydrofluoric acid, phosphoric acid; metal halides, such as aluminum chloride, e.g., $AlCl_3$-hydrocarbon complex, or aluminum bromide, etc., and other liquid alkylation catalysts.

While generally applicable to the alkylation of hydrocarbons, the present invention is particularly effective for the alkylation of low boiling olefins such as ethylene, propylene, butenes, pentenes, etc., with saturated branch chain paraffins such as isobutane, in the presence of aluminum chloride hydrocarbon complex catalyst.

The alkylation reaction is carried out with hydrocarbon reactants in the liquid phase; however, the reactants need not be normally liquid hydrocarbons. The reaction conditions can vary in temperature from sub-zero temperatures to temperatures as high as several hundred degrees Fahrenheit, and can be carried out at pressures, varying from about atmospheric to as high as 1,000 p.s.i. and higher and space velocities from about 0.1 to about 20. In the alkylation of isoparaffins with olefins a substantial molar excess of isoparaffin or olefin is employed, usually to provide a feed ratio in excess of 1:1, usually from about 4:1 to about 20:1 and preferably from about 6:1 to 15:1. The reaction zone is maintained at a sufficient pressure to insure that the hydrocarbon reactants and alkylation catalyst are in the liquid phase. The temperature of the reaction will vary with the reactants and with the catalysts employed, but generally ranges from between about −40° F. to about 150° F.

By the process of this invention various means can be used to separate the catalyst from the reactor effluent containing alkylate and catalyst. Suitable means include using a centrifuge, coalescer, liquid cyclone, and the like. Because of its ease of operation and relatively low pressure drop a liquid cyclone is presently preferred as a means of separation.

The invention can best be described by reference to the accompanying drawing describing a specific process in which reactor effluent from an alkylation reaction is pressured to a cyclone separator located in a position sufficiently elevated above the reactor to produce enough liquid head by the weight of the fluid catalyst to cause return of the catalyst into the reaction system without the aid of a pump. The operation of the process is explained using as an example the alkylation of an ethylene and isobutane feedstock in the presence of an aluminum chloride complex catalyst to form an alkylate product. Flow rates in the example are stated on the basis of per barrel of alkylate product.

Fresh isobutane is pumped through line 10 at a rate of about 0.85 barrel per barrel of alkylate produced, isobutane recycle is pumped through line 11 at a rate of about 8.5 barrels per barrel of debutanized alkylate produced, ethylene is pumped through line 12 at a rate of 80 pounds per barrel of alkylate produced, and aluminum chloride complex catalyst is fed through line 13 at a rate of 10 barrels per barrel of alkylate produced into a reactor 14. The catalyst to total hydrocarbon volume ratio is approximately 1:1, and the isobutane to ethylene mol ratio is about 10:1. The reactor is operated at a temperature of about 125° F. and a pressure of 235 p.s.i.g.

The reaction effluent issues from the agitated reactor through line 15. The hydrocarbon effluent has a specific gravity of 0.57. Line 15 rises 200 feet vertically above the reactor and discharges tangentially into the upper cylindrical section of a liquid cyclone 16. The pressure drop across the cyclone separator is approximately 30 p.s.i. Liquid product is taken overhead from the separator through line 17 and a pressure control valve 18 through line 19 into a fractionator 20 which is controlled at conditions to take isobutane overhead 23 for recycle to the reaction and to take normal butane and alkylate product as the kettle product 24.

The catalyst which has a specific gravity of 1.25 is discharged through the cone section of the cyclone through line 21 through an indiret heat exchanger 22 (cooler) and line 13 back into the reactor 14. There are no valves or pumps in the catalyst return line from the separator to the reactor. Ample pressure to produce flow of catalyst into the reactor is supplied by the height of the fluid catalyst column in the separator outlet. Flow of separated hydrocarbon liquid to the fractionator is manipulated in response to the reactor pressure using pressure control valve 18.

Reasonable variation and modification are possible within the scope of the foregoing disclosure, the drawing and the appended claims to the invention the essence of which is that a method and apparatus is provided for separating a corrosive catalyst from a reactor effluent with return of the catalyst to the reactor without the use of pumps valves or other equipment highly susceptible to corrosion damage.

We claim:

1. A method for recovering and recycling alkylation catalyst from a reaction mixture of alkylation catalyst and alkylation products comprising the steps of:
    (a) discharging the reaction mixture from the reactor at a pressure sufficient to effect separation in a separating means selected from the group consisting of packed coalescers, and liquid cyclones situated at a height above the reactor said height above the reactor being such that the catalyst separated from the mixture has sufficient head pressure to be returned to the reaction zone by gravity flow,
    (b) separating the catalyst and alkylate reaction mixture using said separating means,
    (c) removing alkylate reaction mixture from the separator means, and
    (d) removing catalyst from the separating means and returning it to the reaction system by the effect of fluid head pressure in the return line.

2. The method of claim 1 wherein the flow of catalyst returned to the reaction system is controlled by varying the reactor pressure.

3. The method of claim 1 wherein the alkylation products are produced from the alkylation of an olefin with a saturated branch chain paraffin in the presence of an aluminum chloride catalyst.

4. The method of claim 3 wherein the olefin is ethylene and the paraffin is isobutane the catalyst is aluminum chloride and the separating means is a cyclone separator situated at a height of about 200 feet above the reactor.

References Cited
UNITED STATES PATENTS

| | | | |
|---|---|---|---|
| 2,428,506 | 10/1947 | Vand der Valk | 260—683.47 |
| 2,800,444 | 7/1957 | Hughes et al. | 260—683.47 |
| 2,756,247 | 7/1956 | James, Jr. et al. | 260—683.43 |
| 2,407,136 | 9/1946 | Clarke | 260—683.57 |
| 3,246,047 | 4/1966 | Chapman et al. | 260—683.48 |
| 3,213,157 | 10/1965 | Hays et al. | 260—683.48 |
| 2,488,602 | 11/1949 | Pevere | 260—683.57 |
| 3,470,264 | 9/1969 | Mayhue | 260—683.57 |
| 3,544,651 | 12/1970 | Chapman | 260—683.48 |
| 3,249,649 | 5/1966 | Sherk et al. | 260—683.48 |

PAUL M. COUGHLAN, JR., Primary Examiner

G. J. CRASANAKIS, Assistant Examiner

U.S. Cl. X.R.

260—683.53